United States Patent
Ikeyama et al.

(10) Patent No.: US 11,878,740 B2
(45) Date of Patent: Jan. 23, 2024

(54) RACK BUSHING AND STEERING DEVICE

(71) Applicants: MAZDA MOTOR CORPORATION, Hiroshima (JP); KYB CORPORATION, Tokyo (JP); OILES CORPORATION, Tokyo (JP)

(72) Inventors: Gaku Ikeyama, Hiroshima (JP); Kazuya Sato, Hiroshima (JP); Junya Kuwagaki, Hiroshima (JP); Yoshimitsu Fumimoto, Hiroshima (JP); Masaki Takahashi, Hiroshima (JP); Tomonori Taniguchi, Hiroshima (JP); Takuzo Ito, Tokyo (JP); Mitsuhiko Fujikake, Tokyo (JP); Hiroki Masuda, Tokyo (JP); Hiroyuki Kikuchi, Tokyo (JP); Jun Ouchi, Fujisawa (JP); Kazuhiko Akeda, Fujisawa (JP)

(73) Assignees: MAZDA MOTOR CORPORATION, Hiroshima (JP); KYB CORPORATION, Tokyo (JP); OILES CORPORATION, Tokyo (JP)

( * ) Notice: Subject to any disclaimer, the term of this patent is extended or adjusted under 35 U.S.C. 154(b) by 212 days.

(21) Appl. No.: 17/603,898

(22) PCT Filed: Apr. 2, 2020

(86) PCT No.: PCT/JP2020/015241
§ 371 (c)(1),
(2) Date: Oct. 14, 2021

(87) PCT Pub. No.: WO2020/213423
PCT Pub. Date: Oct. 22, 2020

(65) Prior Publication Data
US 2022/0194461 A1    Jun. 23, 2022

(30) Foreign Application Priority Data
Apr. 15, 2019  (JP) ................. 2019-077434

(51) Int. Cl.
*B62D 3/00*  (2006.01)
*B62D 3/12*  (2006.01)
(Continued)

(52) U.S. Cl.
CPC .............. *B62D 3/123* (2013.01); *F16C 29/02* (2013.01); *F16C 35/02* (2013.01)

(58) Field of Classification Search
CPC . B62D 3/123; B62D 3/12; F16C 29/02; F16C 35/02; F16C 2326/24; F16C 2361/61; F16C 29/002
See application file for complete search history.

(56) References Cited

U.S. PATENT DOCUMENTS

| 8,506,169 B2 | 8/2013 | Nakagawa |
| 2009/0000853 A1 | 1/2009 | Hirose et al. |

(Continued)

FOREIGN PATENT DOCUMENTS

| CN | 107850124 A | 3/2017 |
| CN | 108706043 | 10/2018 |

(Continued)

OTHER PUBLICATIONS

English Translation of WO-2019026928-A1 (Year: 2019).*

(Continued)

*Primary Examiner* — Victor L MacArthur
(74) *Attorney, Agent, or Firm* — Nixon & Vanderhye P.C.

(57) ABSTRACT

A clearance is created between an inner circumference of a bushing main body (2) which surrounds a rack (5) across a row of rack gear teeth (50) and an outer circumference of the rack (5), and two supporting surfaces (21A, 21B) which face each other with a bushing main body axis O therebetween and a supporting surface (21C) which faces a back surface of the rack (5), each extending along an x-axis direction, are formed on the inner circumference of the bushing main body (2). The rack (5) in a neutral state is supported by the two supporting surfaces (21A, 21B) so as to be displaceable along a z-axis direction, and the rack (5) in operation is stably supported by the three supporting surfaces (21A-21C) at three places. A groove bottom position of an annular elastic member attachment groove (24), which is formed on an outer circumference of the bushing main body (2), is offset toward the support surface (21B) only in an area on a support surface (21B) side from the bushing main body axis O, and therefore an elastic ring (3) attached to the elastic member attachment groove (24), protrudes above an outer (Continued)

circumferential surface of the bushing main body (2), but only in the area on the support surface (21B) side from the bushing main body axis O.

4 Claims, 5 Drawing Sheets

(51) Int. Cl.
  *F16C 29/02*  (2006.01)
  *F16C 35/02*  (2006.01)

(56) References Cited

U.S. PATENT DOCUMENTS

| | | |
|---|---|---|
| 2014/0109702 A1 | 4/2014 | Kometani |
| 2015/0204381 A1 | 7/2015 | Zaike et al. |
| 2020/0346681 A1 | 11/2020 | Sekine et al. |
| 2021/0188341 A1 | 6/2021 | Ikeyama et al. |

FOREIGN PATENT DOCUMENTS

| | | |
|---|---|---|
| GB | 2 522 501 A | 7/2015 |
| JP | 2007-008216 | 1/2007 |
| JP | 2008-074218 | 4/2008 |
| JP | 2010-149542 | 7/2010 |
| JP | 4935080 | 5/2012 |
| JP | 2015-137721 | 7/2015 |
| JP | 2016-088340 A | 5/2016 |
| JP | 5984010 | 9/2016 |
| JP | 6120047 | 4/2017 |
| JP | 2019-027575 | 2/2019 |
| JP | 2019-077235 | 5/2019 |
| WO | WO-2019026928 A1 * | 2/2019 ............ B62D 3/126 |

OTHER PUBLICATIONS

International Search Report for PCT/JP2020/015241 dated Jun. 16, 2020, 6 pages.
Written Opinion of the ISA for PCT/JP2020/015241 dated Jun. 16, 2020, 5 pages.
Extended European Search Report dated Nov. 14, 2022 issued in European Application No. 20791819.4 (11 pages).
Search Report dated May 19, 2023 issued in Chinese Application No. 2020800287128 with English translation (5 pages).

* cited by examiner

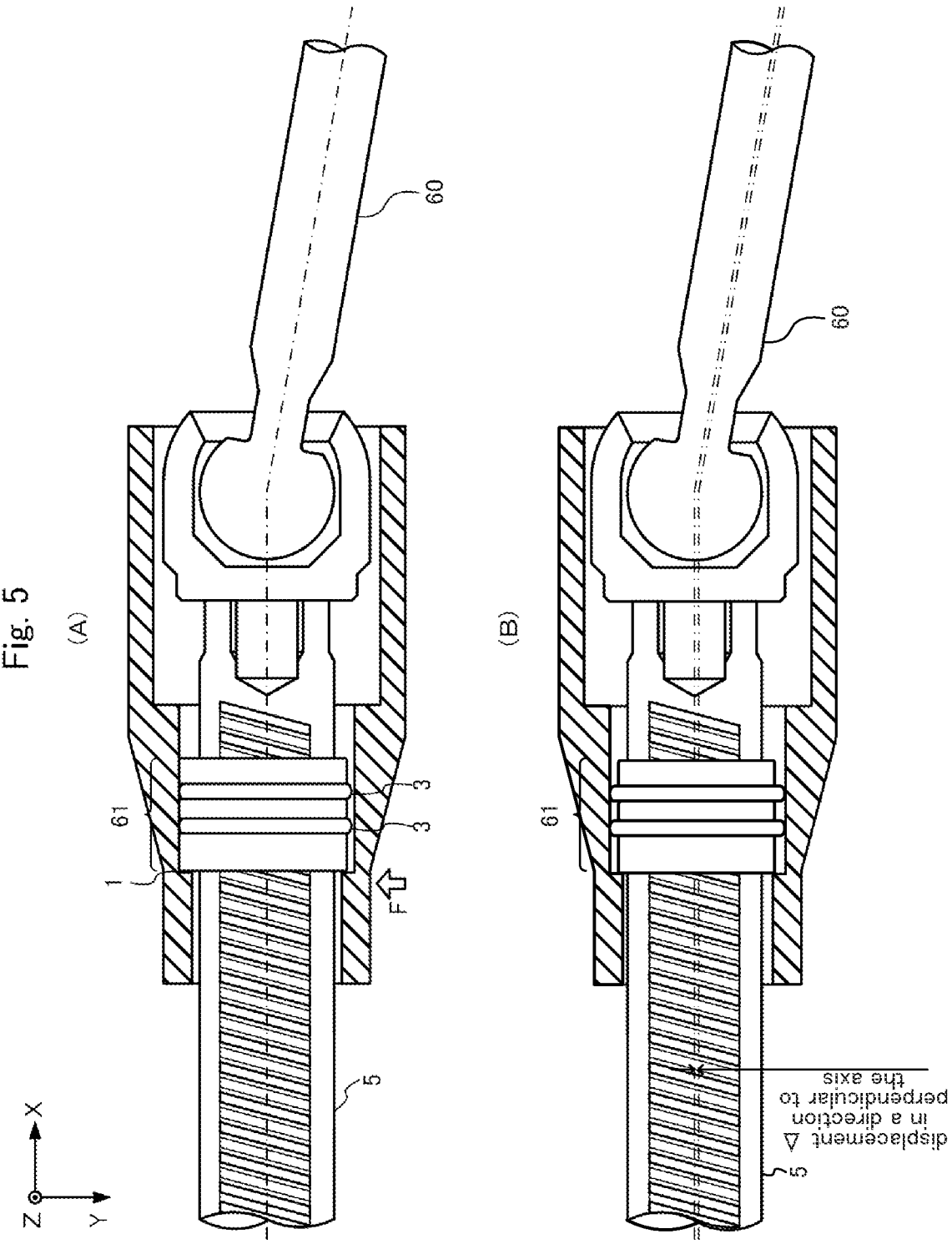

RACK BUSHING AND STEERING DEVICE

This application is the U.S. national phase of International Application No. PCT/JP2020/015241 filed Apr. 2, 2020 which designated the U.S. and claims priority to JP Patent Application No. 2019-077434 filed Apr. 15, 2019, the entire contents of each of which are hereby incorporated by reference.

TECHNICAL FIELD

The present invention relates to a rack bushing intended for use in a steering device of rack-and-pinion type so as to supporting, in a place with a formed rack gear, a steering rack reciprocable in row directions of rack gear teeth.

BACKGROUND ART

The Patent Literature 1 and Patent Literature 2 each disclose two rack bushings made of resin, which support a steering rack while allowing the steering rack to reciprocate in its axial directions, in a dual pinion assist electric power steering system in which two pinion gears (a primary pinion gear located on a steering shaft and a secondary pinion gear to be driven by an assist motor) are placed against a rack gear of the steering rack.

These rack bushings are attached to an inner circumference of a hollow cylindrical rack housing so as to be placed at a second ary-pinion-gear-side end of the steering rack and between the primary pinion gear and the secondary pinion gear. Each of the rack bushings has an annular portion surrounding the steering rack around an axis thereof and an arcuate-section portion extending from one end face of the annular portion in the axial direction of the steering rack so as to face a back of the steering rack. Here, in an inner circumferential surface of the arcuate-section portion, three elastic protrusions in contact with the back of the steering rack are formed along the axial direction of the steering rack, and the steering rack is supported slidably in the axial directions while being biased toward the pinion gear, by these three elastic protrusions.

An elastic force of the elastic protrusions of one rack bushing supporting the secondary-pinion-gear-side end of the steering rack, causes a moment around a mesh position between the secondary pinion gear and the rack gear, in a direction of separating the primary pinion gear and the rack gear relative to each other; whereas an elastic force of the elastic protrusions of another rack bushing supporting the steering rack at a position between the primary pinion gear and the secondary pinion gear, causes a reaction moment to cancel this moment. This prevents an increase of a backlash between the primary pinion gear and the rack gear.

On the other hand, Patent Literature 3 discloses, as a rack bushing intended for use in a steering system of rack-and-pinion type, a rack bushing with an O-ring attached to an outer circumference of a bushing main body. For this rack bushing, the O-ring causes reduction in diameter of the bushing main body with the steering rack inserted therein, and thereby the steering rack is supported, for example, in an axial direction of a pinion with intended stiffness.

CITATION LIST

Patent Literature

Patent Literature 1: Japanese Patent No. 5984010
Patent Literature 2: Japanese Patent No. 6120047
Patent Literature 3: Japanese Patent No. 4935080

SUMMARY OF INVENTION

Technical Problem

For the rack bushing disclosed in each of the Patent Literatures 1 and 2, the annular portion is, however, all around the steering rack in the place with the formed rack gear, due to which a tip of any rack gear tooth may become in contact with an inner circumferential surface of the annular portion when bias of a pressure pad causes the steering rack to be displaced toward the pinion gear. On the other hand, in the rack bushing disclosed in the Patent Literature 3, reduced diameter of the bushing main body by the O-ring may cause a contact between the inner circumferential surface and the tip of any rack gear tooth.

If the steering rack is thereby prevented from movement in an axial direction of the pressure pad, a resultant torque variation is caused, not resulting in stable steering feel. Additionally, if contact with any of the rack gear teeth of the steering rack causes damages to the rack bushing, a resultant backlash occurs in the steering rack, resulting in lower steering feel.

The present invention has been made in view of the above situation, and an object of the invention is to maintain better steering feel over longer periods in a steering device of rack-and-pinion type.

Solution to Problem

In response to the above issue, according to the present invention, a clearance is created between an outer circumference of a steering rack and an inner circumference of a bushing main body surrounding the outer circumference of the steering rack across a row of rack gear teeth, and the inner circumference of the bushing main body includes first and second support surfaces facing each other with an axis of the bushing main body therebetween and a third support surface located opposite from the rack gear with respect to the axis of the bushing main body so as to face an outer circumferential surface of the steering rack, each support surface extending along a row direction of the rack gear teeth; thereby the steering rack in neutral is supported by the first support surface and the second support surface in such a way as to be displaceable inside the bushing main body in a tooth depth direction of the rack gear teeth and the steering rack in operation is stably supported in three places by the first, second, and third support surfaces. Additionally, only within a section on the second-support-surface-side relative to the axis of the bushing main body, a position of a groove bottom of an elastic member attachment groove, which is formed on an outer circumference of the bushing main body so as to be around the axis of the bushing main body, is offset toward the second support surface side; thereby causing an elastic member in annular shape attached to the elastic member attachment groove to project above an outer circumferential surface of the bushing main body, only within the section on the second-support-surface side relative to the axis of the bushing main body.

For example, the present invention provides a rack bushing configured to use in a steering device of rack-and-pinion type so as to support a steering rack while allowing the steering rack to move in a row direction of rack gear teeth in a rack gear of the steering rack, and the rack bushing has the following:

a bushing main body having a hollow cylindrical shape and configured to allow insertion of the steering rack in the row direction of the rack gear teeth; and an elastic member having an annular shape and arranged around an axis of the bushing main body so as to be located between a housing for attachment of the rack bushing and the bushing main body.

The bushing main body has the following:

an inner circumferential surface configured to surround the steering rack across a row of rack gear teeth while allowing the steering rack to be displaced in a tooth depth direction of the rack gear teeth, the inner circumferential surface including three support surfaces aligned in a circumferential direction of the bushing main body and capable of supporting the steering rack while allowing the steering rack to reciprocate in the row direction of the rack gear teeth; and an outer circumferential surface including an elastic member attachment groove which is formed along the circumferential direction of the bushing main body and to which the elastic member is attached.

The inner circumferential surface includes a first support surface, a second support surface, and a third support surface, as the three support surfaces:

the first support surface and the second support surface, each extending in the tooth depth direction of the rack gear teeth, are located in two place opposite each other with the axis of the bushing main body therebetween and are configured to support the steering rack movable in the row direction of the rack gear teeth while allowing the steering rack to be displaced in the tooth depth direction of the rack gear teeth; and the third support surface is located, with respect to the circumferential direction of the bushing main body, between the first support surface and the second support surface and is to face an outer circumferential surface of the steering rack at a position on an opposite side of the axis of the bushing main body from the rack gear.

The elastic member attachment groove has the following:

a first groove section having a groove bottom located on and running along an arc that belongs to a first imaginary circle having a center lied on the axis of the bushing main body and that is located closer to the first support surface than the axis of the bushing main body; and a second groove section having a groove bottom located on and running along an arc which belongs to a second imaginary circle defined as a shifted duplicates of the first imaginary circle toward the second support surface and which is located closer to the second support surface than the axis of the bushing main body.

Furthermore, a steering device according to the present invention, is configured to cause a pinion gear provided on a steering shaft to mesh with a rack gear of a steering rack linked to a tie rod, thereby allowing the steering rack to reciprocate in an axial direction of the steering rack, and has the following:

a rack housing having a hollow cylindrical shape, in which the steering rack is inserted in a row direction of the rack gear teeth on the rack gear; and the above rack bushing attached to an inner circumferential surface of the rack housing to intervene between the steering rack and the inner circumferential surface of the rack housing and supporting the steering rack while allowing the steering rack to move in the row direction of the rack gear teeth.

The first groove section is located closer to a place in which the steering rack is to push the rack bushing against the rack housing due to a reaction force from the tie rod when pushing the tie rod, than the axis of the bushing main body, and between the outer circumferential surface of the bushing main body and the inner circumferential surface of the rack housing, there is a space created by the elastic member embedded in the elastic member attachment groove depending on protrusion amount of the elastic member above the outer circumferential surface of the bushing main body.

Advantageous Effects of Invention

According to the present invention, in the inner circumferential surface of the bushing main body which has a hollow cylindrical shape and which surrounds the steering rack across the row of the rack gear teeth while allowing the steering rack to be displaced in the tooth depth direction of the rack gear teeth, the first support surface and the second support surface each extending along the tooth depth direction of the rack gear teeth, are formed to face each other with the axis of the bushing main body intervening therebetween, and the steering rack is supported displaceably in the row direction of the rack gear teeth by these first support surface and second support surface, thus allowing the steering rack to move in an axial direction of a pressure pad without a contact between the rack gear and the inner circumference of the bushing main body.

Additionally, the position of the groove bottom inside the elastic member attachment groove in annular shape, which is formed on the outer circumference of the bushing main body, is offset toward the second support surface side, but only inside the section on the second-support-surface-side relative to the axis of the bushing main body; therefore the elastic member in annular shape attached to this elastic member attachment groove is the largest in protrusion amount above the outer circumference of the bushing main body, at the place of the second support surface, while smaller within the other region. This reduces reaction force of the annular elastic member compressed between the inner circumference of the rack housing and the groove bottom of the elastic member attachment groove, in component in the tooth depth direction of the rack gear teeth, thus more reliably ensuring against contact between the inner circumference of the bushing main body and the rack gear.

Consequently, according to the present invention, a torque variation is reduced and the rack bushing is protected from damage, resulting in maintenance of a stable steering feel over longer periods.

BRIEF DESCRIPTION OF DRAWINGS

FIG. 5(A) and FIG. 5(B) are views for explanation about differences between two cases: one case of using the rack bushing 1 according to one embodiment of the present invention in the dual pinion assist electric power steering mechanism; and another case of using a rack bushing 1 in which the elastic ring 3 projects beyond an outer circumferential surface of a bushing main body continuously throughout its circumferential length.

DESCRIPTION OF EMBODIMENTS

In the following, one embodiment of the present invention will be described with reference to the drawings. In the present embodiment, a dual pinion assist electric power steering mechanism is given as a non-limited example of steering devices of rack-and-pinion type to which the present invention is applicable.

Figure 1:
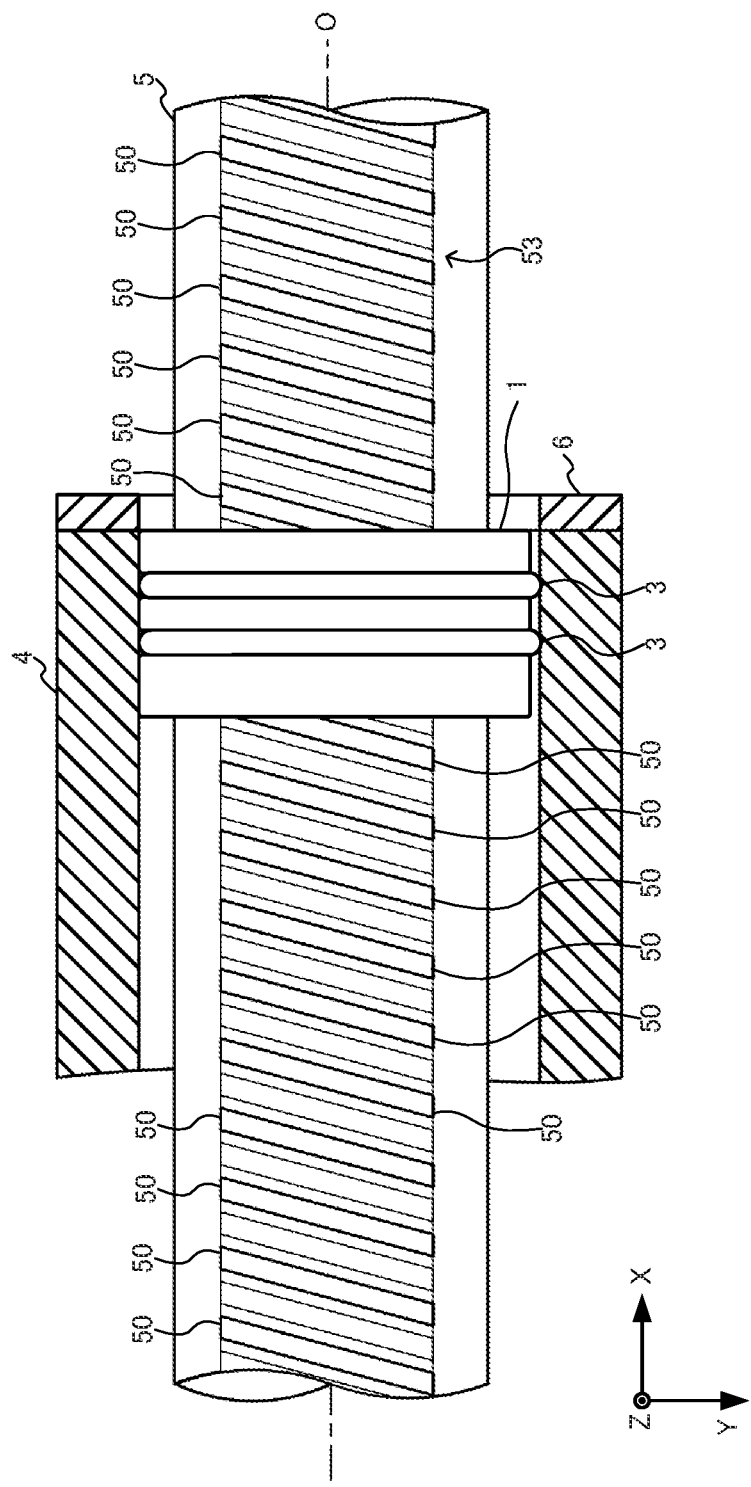
FIG. 1 is a partial cross-sectional view of a dual pinion assist electric power steering mechanism according to one embodiment of the present invention.

FIG. 1 is a partial cross-sectional view of the dual pinion assist electric power steering mechanism according to the present embodiment. It should be appreciated that a coordinate system is defined in FIG. 1 just for convenience of description, which has an x-axis along a row direction of rack gear teeth 50 on a rack gear 53 of a steering rack 5, a z-axis along a tooth depth direction of the rack gear teeth 50, and a y-axis perpendicular to an x-z plane, and which is appropriately used in the other drawings as well.

As illustrated in the figures, the dual pinion assist electric power steering mechanism according to the present embodiment has the following: a rack housing 4 with a cap 6, which has a hollow cylindrical shape and which is to be attached to any vehicle body; a steering rack 5 which has a solid cylindrical shape and which is inserted in the rack housing 4 in a direction of the x-axis; one or more rack bushings for dual pinion assist electric power steering (hereinafter, simply referred to as "rack bushing") 1, which are attached to an inner circumference of the rack housing 4 so as to intervene between the inner circumference of the rack housing 4 and an outer circumference of the steering rack 5, for example, an outer circumference of one end portion thereof; a first pinion gear (not illustrated in the figures) provided on a steering shaft; and a second pinion gear (not illustrated in the figures) to be driven by an assist motor.

Here, the steering rack 5 is supported, with tie rods swingably linked to both end, by the rack bushing 1 within the rack housing 4 so as to be reciprocable in the directions of the x-axis, and the first and second pinion gears are each located in a corresponding predetermined mesh position so as to mesh with the rack gear 53 arranged on the outer circumference of the steering rack 5 along a direction of an axis thereof. FIG. 1 exemplifies the rack bushing 1 which is located, but not limited to, around one end portion of the steering rack 5: an additional rack bushing 1 may also be located around a place other than one end portion of the steering rack 5, such as between the pinion gear and the pinion gear.

Figure 2:
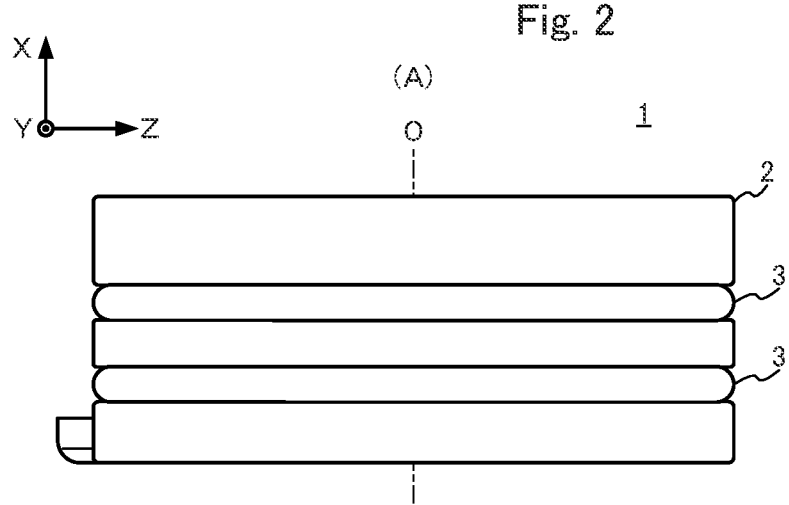
FIG. 2(A), FIG. 2(B) and FIG. 2(C) are respectively a plan view, a front view, and a side view, of a rack bushing 1.
Figure 2:
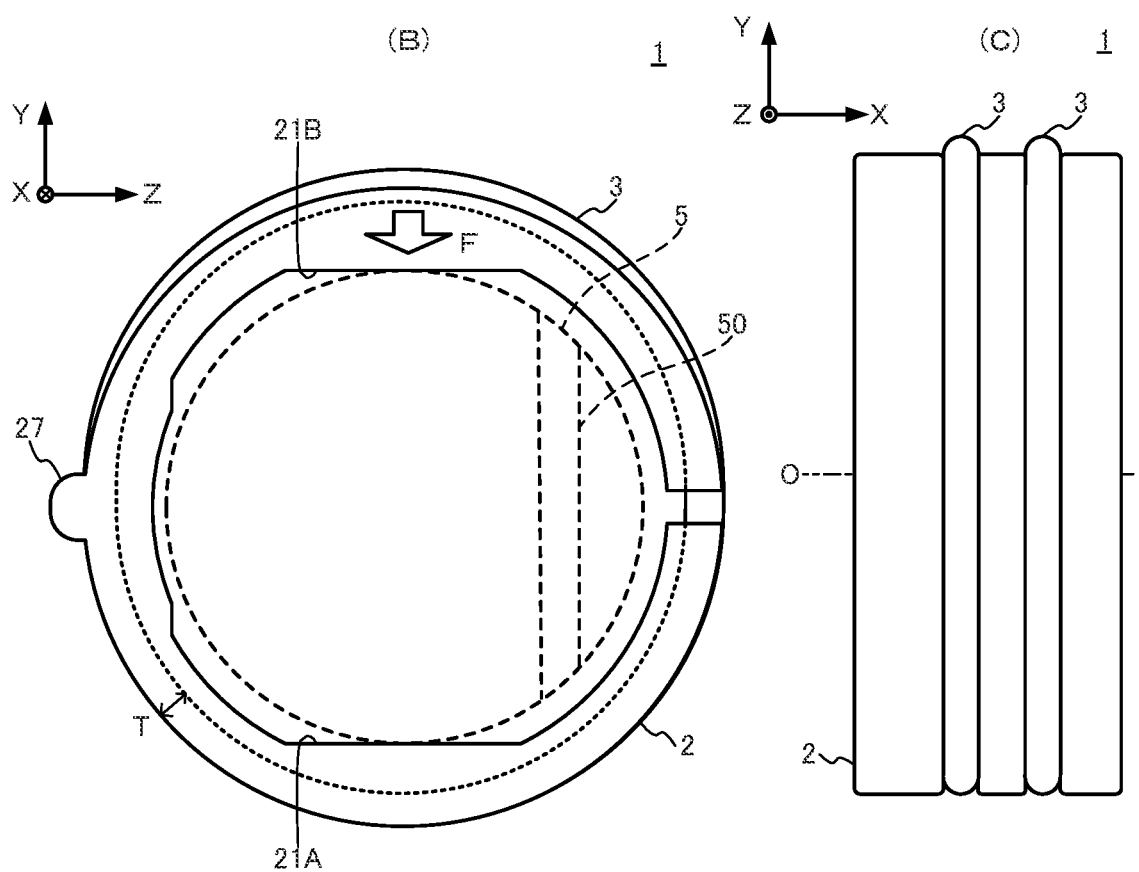

FIG. 2(A), FIG. 2(B) and FIG. 2(C) are respectively a plan view, a front view, and a side view, of the rack bushing 1. It should be appreciated that FIG. 2 also illustrates components other than the rack bushing 1 (e.g. the steering rack 5 by indicated by the dashed lines), just for convenience of description.

As illustrated in the figures, the rack bushing 1 has the following: a bushing main body 2 having a hollow cylindrical shape and allowing insertion of the steering rack 5 thereinto in the direction of the x-axis; and one or more elastic rings 3 attached to an outer circumference of the bushing main body 2 to be arranged around an axis O thereof. The present embodiment includes an example in which the two elastic rings 3 are attached to the outer circumference of the bushing main body 2, being spaced an appropriate distance apart, but not limited to the respect: one elastic ring 3 or three or more elastic rings 3 arranged at appropriate intervals, may be attached to the outer circumference of the bushing main body 2.

Figure 3:
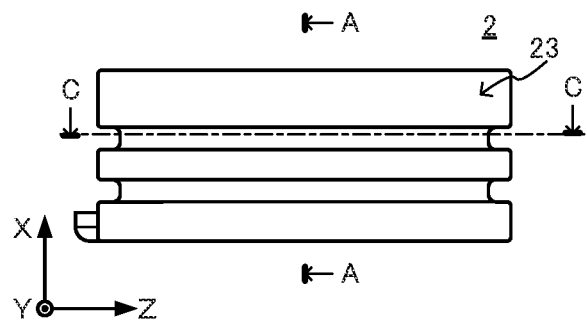
FIG. 3(A), FIG. 3(B) and FIG. 3(C) are respectively a plan view, a front view, and a side view, of a bushing main body 2.
FIG. 3(D) is a B-B cross-sectional view of FIG. 3(B)
FIG. 3(E) is an A-A cross-sectional view of FIG. 3(A).
Figure 3:
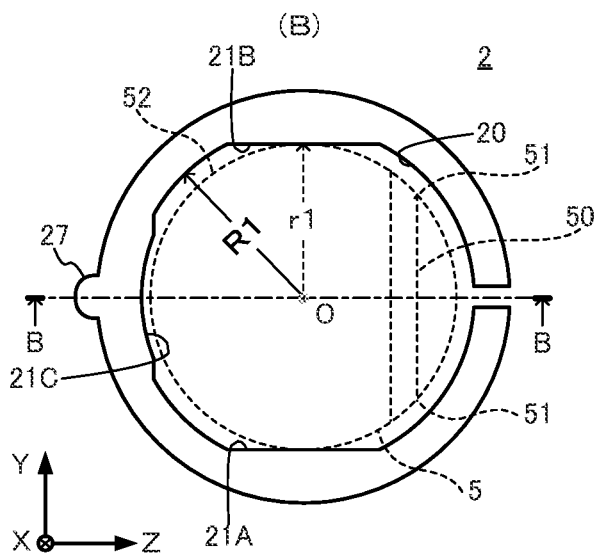
Figure 3:
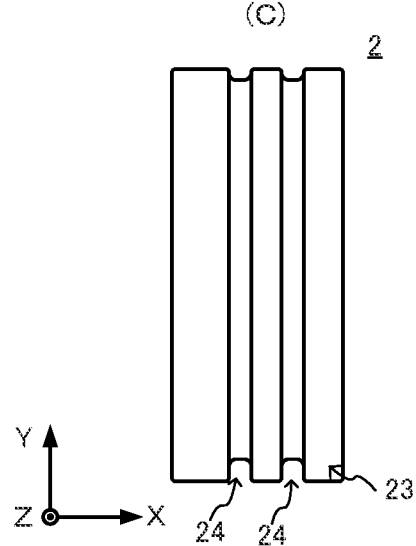
Figure 3:
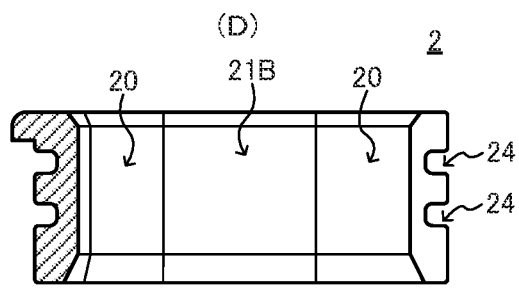
Figure 3:
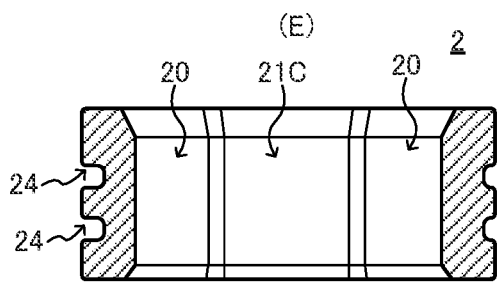

FIG. 3(A), FIG. 3(B) and FIG. 3(C) are respectively a plan view, a front view, and a side view, of the bushing main body 2, FIG. 3(D) is a B-B cross-sectional view of FIG. 3(B), and FIG. 3(E) is an A-A cross-sectional view of FIG. 3(A). It should be appreciated that FIG. 3 also illustrates components other than the rack bushing 1 (e.g. the steering rack 5 indicated by the dashed lines) additionally, just for convenience of description.

As illustrated in the figures, the bushing main body 2 is a cylindrical member capable of expanding and contracting in radial directions, which is made of synthetic resin excellent in sliding properties, such as polyacetal resin, polyamide resin, and polyethylene resin, and it is located across a row of the rack gear teeth 50 so as to surround the steering rack 5 around the axis thereof.

Here, an inner circumferential surface 20 of the bushing main body 2 has, except for respective areas shaped into below-mentioned support surfaces (a first support surface 21A, a second support surface 21B, and a third support surface 21C) lying for support of the outer circumferential surface of the steering rack 5, a columnar surface shape with an inner radius R1 larger than an outer radius r1 of the steering rack 5 so as to create an appropriate clearance from a tip corner portion 51 of any gear tooth 50. This allows the steering rack 5, when biased in a direction of the z-axis by a pressure pad, to be displaced in the direction of the z-axis without a contact between the tip corner portion 51 of each gear tooth 50 and the inner circumferential surface 20 of the bushing main body 2 in order to prevent increase of backlash which would otherwise be caused by wear of gear, etc.

Furthermore, the inner circumferential surface 20 of the bushing main body 2 includes the surface formed therein, which serves as the support surface (the third support surface 21C) for support of a columnar surface shape area (an areas except for an area formed into the rack gear 53) 52 on the outer circumference of the steering rack 5 in operation receiving a load in the direction of the z-axis from the first and second pinion gears and so on, and which faces the columnar surface shape area 52 of the steering rack 5 at a place opposite from the rack gear 53 with respect to the axis O of the bushing main body 2. In the present embodiment, a concave surface curved following the columnar surface shape area 52 on the outer circumference of the steering rack 5 is, as the third support surface 21C, formed extending along the direction of the x-axis. The inner circumferential surface 20 of the bushing main body 2 further includes the two flat surfaces formed therein along the [z-x plane] x-z plane, which face each other with the axis O of the bushing main body 2 intervening, and which serve as the two support surfaces (the first support surface 21A and the second support surface 21B) for support of the columnar surface shape area 52 on the outer circumference of the steering rack 5 at respective places on both sides of diameter along a direction of the y-axis.

While the steering rack 5 is in neutral, the steering rack 5 is supported, by the first support surface 21A and the second support surface 21B, with a clearance in the direction of the z-axis between the columnar surface shape area 52 on the outer circumference and the third support surface 21C, thereby being displaceable in the directions of the z-axis and restrained from being displaced in the direction of the y-axis. Consequently, if the steering rack 5 becomes displaced in the direction of the z-axis at the start of steering operation, the steering rack 5 is not prevented from such movement, whereas prevented from movement in the direction of the y-axis that tends to cause a delay in changing a direction of a car body; which allows a driver to get more stable steering feel. Moreover, the first support surface 21A and the second support surface 21B are flat surfaces, and thereby the first support surface 21A and the second support surface 21B both come into contact with the columnar surface shape area 52 on the outer circumference of the steering rack 5 in respective linear areas in the direction of the x axis. This increases surface pressure in comparison with if the steering rack 5 is supported by plane contact and resultantly decreases friction coefficients of the first support surface 21A and the second support surface 21B on the steering rack 5, thereby resulting in reduction of friction between the steering rack 5 and both the first support surface 21A and the second support surface 21B.

While the steering rack 5 is in operation, the steering rack 5 is supported in the following three places, therefore keeping more stable orientation: the first support surface 21A, the second support surface 21B, and the third support surface 21C located at circumferential position between the first support surface 21A and the second support surface 21B. The third support surface 21C, which has the concave surface curved following the columnar surface shape area 52 on the outer circumference of the steering rack 5, comes into plane-contact with the steering rack 5 to be subject to the load from the steering rack 5 over a larger area, therefore resulting in reduction in wear of the third support surface 21C due to slide on the steering rack 5.

On the other hand, an outer circumferential surface 23 of the bushing main body 2 has a protrusion 27 formed at one end. The rack housing 4 includes a cutout formed in a place corresponding to this protrusion 27 and the protrusion 27 of the bushing main body 2 is fitted within the cutout of the rack housing 4, thereby constraining relative rotation about the axis O between the rack bushing 1 and the rack housing 4. Moreover, the cap 6 in ring shape becomes attached to an opening end of the rack housing 4 with the protrusion 27 of the bushing main body 2 fitted within the cutout of the rack housing 4, thereby preventing the rack bushing 1 from dropping out of the rack housing 4 (See FIG. 1).

In the outer circumferential surface 23 of the bushing main body 2, one or more elastic member attachment grooves 24 for embedment of the elastic rings 3 are formed along a circumferential direction of the bushing main body 2. The present embodiment, since using the two elastic rings 3, exemplifies a case in which the two elastic member attachment grooves 24 for embedment of the respective elastic rings 3 are formed on the outer circumferential surface 23 of the bushing main body 2, but not limited to this case; one elastic member attachment groove 24 or three or more elastic member attachment grooves 24 may be formed in the outer circumferential surface 23 of the bushing main body 2.

Figure 4:
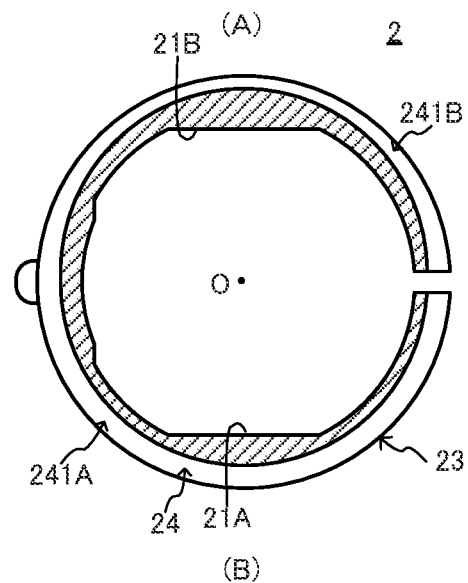
FIG. 4(A) is a C-C cross-sectional view of FIG. 3(A)
FIG. 4(B) is a view for explanation about a position of a groove bottom inside an elastic member attachment groove 24.
Figure 4:
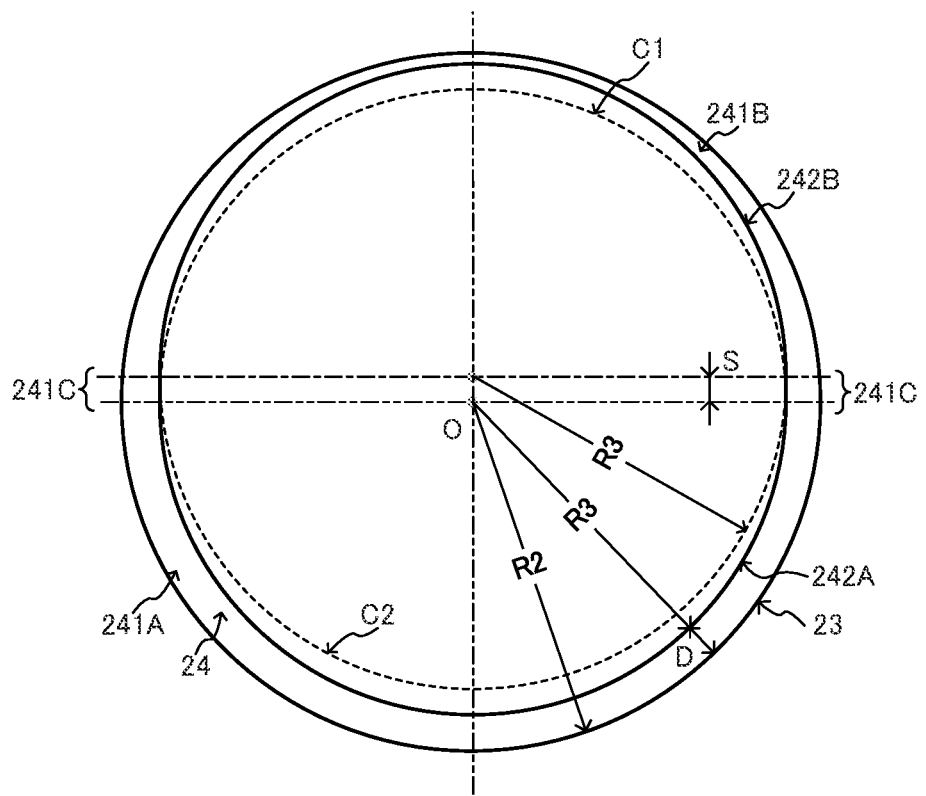

FIG. 4(A) is a C-C cross-sectional view of FIG. 3(A), and FIG. 4(B) is a view for explanation about position of groove bottom inside each of the elastic member attachment grooves 24.

As illustrated in the figures, the elastic member attachment grooves 24 each include a first groove section 241A and a second groove section 241B, the first groove section 241A is located closer the first support surface 21A than the axis O of the bushing main body 2 is, and the second groove section 241B is located closer the second support surface 21B than the axis O of the bushing main body 2 is. Referring to a YZ cross section of the bushing main body 2, for example, if a first imaginary circle C1 is defined around the axis O of the bushing main body 2 so as to have a radius R3 smaller than an outer radius R2 of the bushing main body 2 by a predetermined dimension D, it is understood that a groove bottom 242A of the first groove section 241A is formed on a following semicircular arc so as to run along this semicircular arc: the semicircular arc belongs to the first imaginary circle C1 and is located closer the first support surface 21A than the axis O of the bushing main body 2 is. On the other hand, a groove bottom 242B of the second groove section 241B is formed on a following semicircular arc so as to run along this semicircular arc: the semicircular arc belongs to a second imaginary circle C2 which is defined as a shifted duplicates of the first imaginary circle C1 toward the second support surface 21B by the predetermined distance S (less than D), and is located closer the second support surface 21B than the axis O of the bushing main body 2.

This ensures the first groove section 241A and connect sections 241C between the first groove section 241A and the second groove section 241B to have groove depth dimensions D, whereas groove depth of the second groove section 241B decreases gradually from the dimension D nearly equal to that of the first groove section 241A with the decreasing distance from the second support surface 21B, falling to resultant minimum dimension (D-S) at a position of the second support surface 21B.

Each of the elastic rings 3 is an elastic member having an annular shape, which is made of elastic materials, such as synthetic rubber or thermoplastic elastomer. As illustrated in FIG. 2(B), an elastic ring available as each of the elastic rings 3, may have a cross section diameter T that is at least as large as the minimum dimension (D-S) of groove depth of the second groove section 241B but not more than the groove depth dimension D of the first groove section 241A, for example. When this elastic ring 3 is fitted in the elastic member attachment groove 24 of the bushing main body 2, as illustrated in FIG. 2(A), FIG. 2(B) and FIG. 2(C), this elastic ring 3 lies without projecting above. the outer circumferential surface 23 of the bushing main body 2 in an area of the first groove section 241A and in the connection sections 241C between the first groove section 241A and the second groove section 241B, while it lies projecting above the outer circumferential surface 23 of the bushing main body 2 in only an area of the second groove section 241B, being the largest at the place of the second support surface 21B in protrusion amount.

For example, when a rack bushing with elastic rings projecting above an outer circumference of a bushing main body continuously throughout its all circumferential length is attached an inner circumference of a rack housing, as illustrated in FIG. 5(B), the steering rack 5 subjected to reaction force from a tie rod 60 have, prior to linear movement in the direction of the x-axis, displacement in the direction of the y-axis (the displacement in a direction perpendicular to the axis O amounts Δ) while compressing the elastic rings. This generates time lags from steering operation to actual start of turn of tires, which tends to affect steering feel.

Conversely, as illustrated in FIG. 5(A), when the rack bushing 1 according to the present embodiment is housed within the rack housing 4 in such a way that the first groove section 241A is situated closer to a place 61 in which the steering rack 5 is to be pushed against the rack housing 4 due to the reaction force of a tie rod 60 than the axis O of the bushing main body 2 is, the elastic rings 3 embedded in the elastic member attachment grooves 24 create, between the outer circumferential surface 23 of the bushing main body 2 and an inner circumferential surface of the rack housing 4, a space depending on their protrusion amount above the outer circumferential surface 23 of the bushing main body 2; however, within the area 61 in which the rack bushing 1 is to be pushed against the rack housing 4 by the steering rack 5 subjected to the reaction force from the tie rod 60, the outer circumferential surface 23 of the bushing main body 2 and the inner circumferential surface of the rack housing 4 abut each other with no gap because each of the elastic rings 3 lies entirely embedded in the corresponding first groove section 241A. This enables reduction in possible displacement of the steering rack 5 when being subjected to the reaction force from the tie rod 60, thereby resulting in reduction in time lag from the steering operation to actual start of turn of tires and in no discomfortable feel in steering.

Moreover, each of the elastic rings 3 is compressed between the groove bottom and the inner circumferential surface of the rack housing 4 but only within the area of the second groove section 241B, and therefore the bushing main body 2 is compressed in a direction of pushing the first support surface 21A and the second support surface 21B against the steering rack 5 (in the direction of the y-axis) due to the reaction force F of the elastic ring 3. This causes the steering rack 5 to be securely restrained from displacement in the direction of the y-axis by the first support surface 21A and the second support surface 21B, thereby resulting in less vibration of the steering rack 5 in an axial direction of the first pinion gear or of the second pinion gear. Additionally, the bushing main body 2 is almost uncompressed in the direction of the z-axis and therefore the clearance is kept between the tip of any gear tooth 50 and the inner circumferential surface 20 of the bushing main body 2 thereby ensuring against a contact therebetween.

As described above, in the present embodiment, the first support surface 21A and the second support surface 21B each extending along the tooth depth direction of the rack gear teeth 50, face each other with the axis O of the bushing main body 2 therebetween and are located on an inner circumference of the bushing main body 2 of hollow cylindrical shape that surrounds the steering rack 5 in a place across the row direction of the rack gear teeth 50 in such a way of allowing displacement of the steering rack 5 in the tooth depth direction of the rack gear teeth 50; thereby the steering rack 5 is supported displaceably in the tooth depth direction of the rack gear teeth 50 by these first support surface 21A and second support surface 21B. This allows the steering rack 5 to move in an axial direction of the pressure pad without contact between the tip of any gear tooth 50 and the inner circumference of the bushing main body 2.

Moreover, only within the area that is closer to the second support surface 21B than the axis O of the bushing main body 2, the position of the groove bottom inside each of the elastic member attachment grooves 24 formed on the outer circumference of the bushing main body 2, is offset toward the second support surface 21B, and therefore protrusion amount of the elastic ring 3 attached to this elastic member attachment groove 24 above the outer circumferential surface 23 of the bushing main body 2 is the largest at the position of the second support surface 21B, while smaller within the other region. Consequently, only within the area of the second groove section 241B, the elastic ring 3 is compressed between the groove bottom inside the second groove section 241B and the inner circumferential surface of the rack housing 4, and resultant reaction force F thereof compresses the bushing main body 2 in the direction of pushing the first support surface 21A and the second support surface 21B against the steering rack 5 (in the direction of the y-axis), therefore causing the steering rack 5 to be securely restrained from displacement in the direction of the y-axis by the first support surface 21A and the second support surface 21B. This enables less vibration of the steering rack 5 in the axial direction of the first pinion gear or of the second pinion gear. In addition, in contrast to such a case that an elastic ring reduces diameter of a bushing main body actively, the reaction force F with which the elastic ring compressed between the inner circumference of the rack housing 4 and the groove bottom of the elastic member attachment groove 24 pushes back is reduced in component in the tooth depth direction of the rack gear teeth 50; which resulting in more secure prevention of a contact between the inner circumferential surface of the bushing main body 2 and the tip of any gear tooth 50.

Therefore, according to the present embodiment, torque variation is reduced and the rack bushing is protected from damage, thus resulting in maintenance of a stable steering feel over longer periods in the dual pinion assist electric power steering mechanism.

The present invention can include, but is not limited to the above embodiments: it will be obvious to those skilled in the art that various changes may be made without departing from the scope of the invention. For example, the above embodiments give the application examples to the dual pinion assist electric power steering mechanism, but the present invention is available not only for the dual pinion assist electric power steering mechanism but also widely in general for any steering device of rack-and-pinion type with a structure in which a steering rack is supported near a mesh position between a pinion gear and a rack gear, for example.

REFERENCE SIGNS LIST

1: rack bushing; 2: bushing main body; 3: elastic ring; 4: rack housing; 5: steering rack; 6: cap; 20: inner circumferential surface of the bushing main body 2; 21A: first support surface; 21B: second support surface; 21C: third support surface; 23: outer circumferential surface of the bushing main body 2; 24: elastic member attachment groove; 27: protrusion; 50: rack gear tooth; 51: corner portion of tip of rack gear tooth; 52: columnar surface shape area on the outer circumference of the steering rack; 53: rack gear; 241A: first groove section; 241B: second groove section.

The invention claimed is:

1. A steering device configured to cause a pinion gear provided on a steering shaft to mesh with a rack gear of a steering rack with a tie rod swingably linked, thereby allowing the steering rack to reciprocate in an axial direction of the steering rack, the steering device comprising:
 a rack housing having a hollow cylindrical shape, the steering rack being inserted in the rack housing in a row direction of rack gear teeth; and
 a rack bushing attached to the rack housing to intervene between the steering rack and an inner circumferential surface of the rack housing, the rack bushing supporting the steering rack while allowing the steering rack to move in the row direction of the rack gear teeth, the rack bushing comprising:
  a bushing main body having a hollow cylindrical shape, the steering rack being inserted into the bushing main body in the row direction of the rack gear teeth; and an elastic member having an annular shape and arranged around an axis of the bushing main body so as to be located between the rack housing and the bushing main body;

the bushing main body comprising:
- an inner circumferential surface surrounding the steering rack across a row of the rack gear teeth and supporting the steering rack, the inner circumferential surface being configured to allow the steering rack to reciprocate in the row direction of the rack gear teeth and to be displaced in a tooth depth direction of the rack gear teeth; and
- an outer circumferential surface including an elastic member attachment groove formed along a circumferential direction of the bushing main body, the elastic member being attached to the elastic member attachment groove;

the inner circumferential surface comprising:
- a first support surface and a second support surface each being flat and extending along the tooth depth direction of the rack gear teeth, the first support surface and the second support surface being located place opposite each other with the axis of the bushing main body therebetween and supporting the steering rack movable in the row direction of the rack gear teeth while allowing the steering rack to be displaced in the tooth depth direction of the rack gear teeth; and
- a third support surface located, with respect to the circumferential direction of the bushing main body, between the first support surface and the second support surface, and facing an outer circumferential surface of the steering rack at a position on an opposite side of the axis of the bushing main body from the rack gear teeth and with a clearance in the tooth depth direction of the rack gear teeth between the outer circumferential surface of the steering rack and the third support surface; and the elastic member attachment groove comprising:
- a first groove section having a groove bottom located on and running along an arc which belongs to a first imaginary circle having a center lying on the axis of the bushing main body and which is located closer to the first support surface than the axis of the bushing main body; and
- a second groove section having a groove bottom located on and running along an arc which belongs to a second imaginary circle defined as a shifted duplicate of the first imaginary circle toward the second support surface than the axis of the bushing main body, wherein the first groove section is located closer to a place in which the steering rack is to push the rack bushing against the rack housing due to a reaction force from the tie rod when pushing the tie rod, than the axis of the bushing main body, and wherein between the outer circumferential surface of the bushing main body and the inner circumferential surface of the rack housing, there is a space created by the elastic member embedded in the elastic member attachment groove depending on a protrusion amount of the elastic member above the outer circumferential surface of the bushing main body.

2. A steering device according to claim 1, wherein the elastic member having the annular shape has a cross section diameter that is not more than a depth of the first groove section and not less than a minimum depth of the second groove section.

3. A steering device according to claim 1, wherein the third support surface includes a curved surface extending in an axial direction of the bushing main body and following an external shape of the outer circumferential surface of the steering rack.

4. A steering device according to claim 2, wherein the third support surface includes a curved surface extending in an axial direction of the bushing main body and following an external shape of the outer circumferential surface of the steering rack.

* * * * *